July 19, 1949.

R. F. HREBEK 2,476,868

APPARATUS FOR CONTINUOUSLY
VULCANIZING STRIP MATERIAL

Filed Nov. 20, 1946

INVENTOR
Robert F. Hrebek
BY
Evans + McCoy
ATTORNEYS

July 19, 1949.
R. F. HREBEK
2,476,868
APPARATUS FOR CONTINUOUSLY
VULCANIZING STRIP MATERIAL
Filed Nov. 20, 1946
3 Sheets-Sheet 2
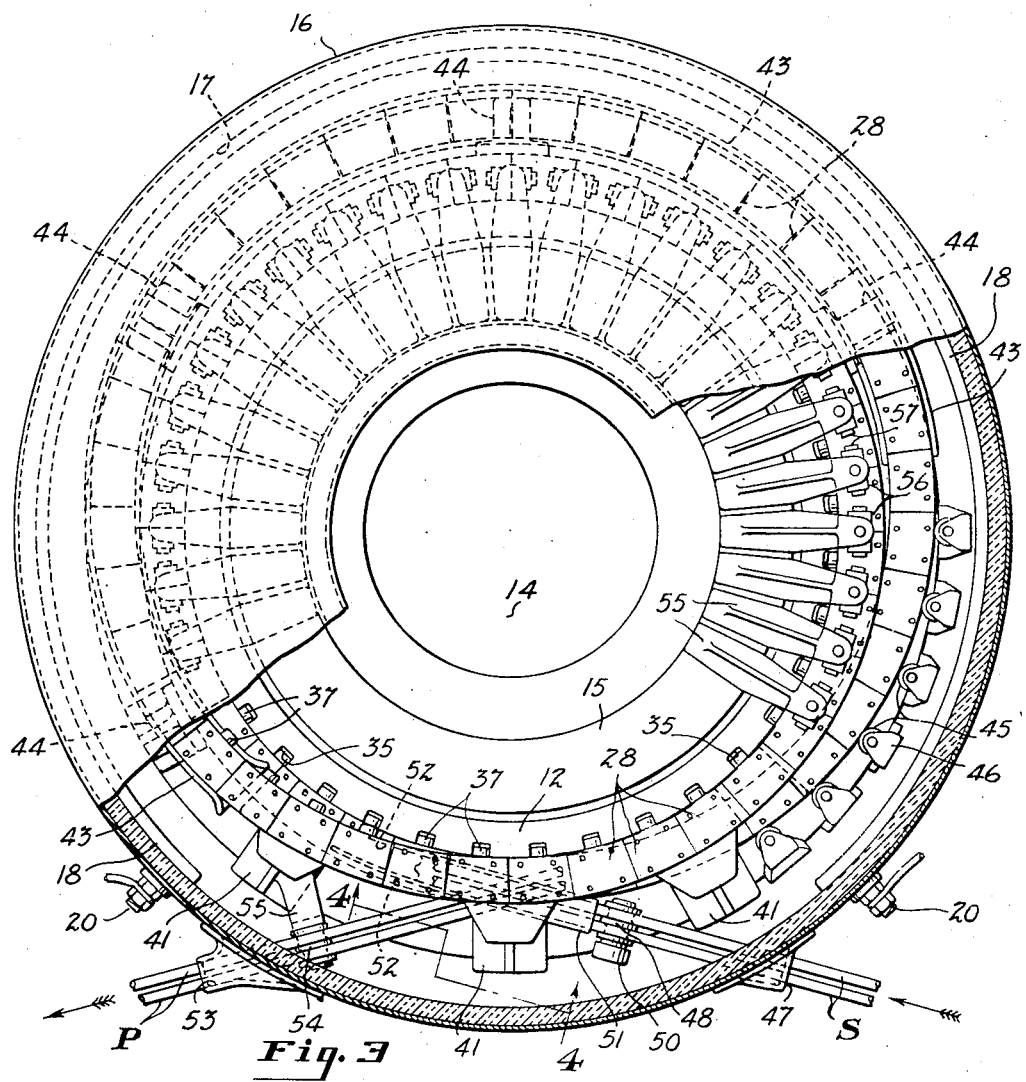
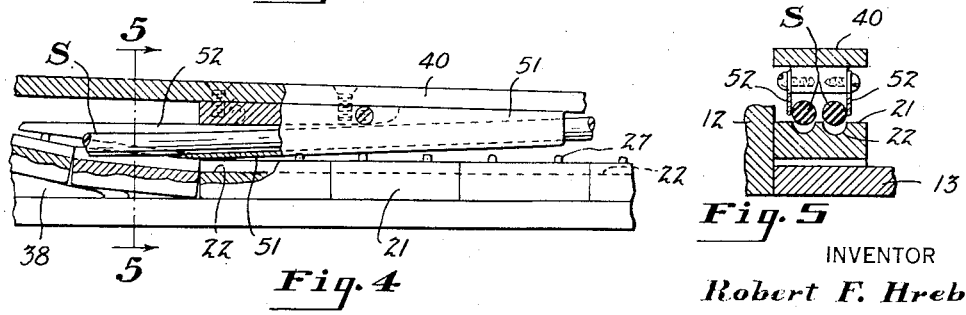
INVENTOR
*Robert F. Hrebek*
BY
*Evans & McCoy*
ATTORNEYS July 19, 1949.

R. F. HREBEK 2,476,868

APPARATUS FOR CONTINUOUSLY
VULCANIZING STRIP MATERIAL

Filed Nov. 20, 1946

INVENTOR
Robert F. Hrebek
BY Evans + McCoy
ATTORNEYS

Patented July 19, 1949

2,476,868

UNITED STATES PATENT OFFICE 2,476,868

APPARATUS FOR CONTINUOUSLY VULCANIZING STRIP MATERIAL

Robert F. Hrebek, University Heights, Ohio, assignor to The Columbia Rubber Mold Company, Cleveland, Ohio, a corporation of Ohio Application November 20, 1946, Serial No. 711,043

8 Claims. (Cl. 18—6)

1

This invention relates to an apparatus for treating strip material, which treatment includes passing said strip material through a heated zone to cure or vulcanize it and produce the finished strip material.

The invention may be applied with great advantage to the production of strip material, such as sponge rubber strip of any desired cross sectional configuration, and may also be applied with advantage to the production of strip material containing solid rubber or similar plastic compositions which require exposure to heat to produce the finished product.

It is an object of the present invention to provide apparatus for continuously vulcanizing or curing strip material in which strip material may be fed in at one point and the finished product removed at another point in a continuous operation to produce strip material of any desired length without requiring the joining of adjacent lengths of the material.

Another object is to provide an apparatus for continuously vulcanizing strip material which is capable of producing said material quickly and within a relatively small space, thus permitting production on a more efficient and inexpensive basis.

A further object is to provide an apparatus for continuously vulcanizing strip material of the type utilizing a mold cavity defined by two endless series of mold sections joined together and arranged to cooperatively provide a movable mold cavity in which a major portion of the endless series is in use at all times, and thus reducing the required size of the apparatus and the space required for the production of strip material.

A still further object of the present invention is to provide apparatus for continuously vulcanizing strip material in which the endless series of mold sections are disposed in a helical path, and in which individual turns of the helix engage and rest upon adjacent turns of the helix, whereby mold sections in the upper portions of the helical path facilitate the maintaining of a closure between mold sections lower in the helical path.

Other objects and advantages of the present invention will become apparent from the following detailed description accompanied by the drawings, in which:

Fig. 3 is an enlarged plan view of the apparatus with parts broken away to illustrate the arrangement of parts whereby strip material may be fed into the machine and removed therefrom after treatment;

Fig. 4 is an enlarged fragmentary view, taken substantially on line 4—4 of Fig. 3, showing the manner in which strip material may be fed to the machine;

Fig. 5 is an enlarged sectional view, taken substantially on line 5—5 of Fig. 4, illustrating further details of the infeed mechanism;

Figure 1:
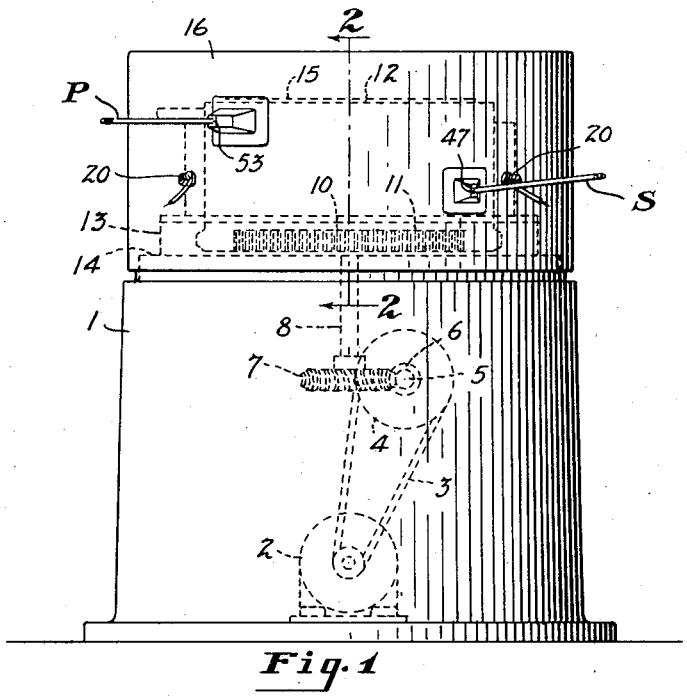
Figure 1 is a side elevation of a preferred form of apparatus embodying the present invention.

Looking at Fig. 1 it may be seen that the apparatus comprises a hollow base portion 1 which supports a suitable source of power, such as a motor 2. The motor drives, through a belt 3, a pulley 4 which is secured to a horizontal shaft 5 journaled in the base 1. The shaft 5 also has secured thereto a worm 6 which engages and drives a worm wheel 7 thus rotating a vertical shaft 8 which may be mounted for rotation near the upper portion of the base 1.

The shaft 8 carries a pinion 10 which engages and drives an internal gear 11. The gear 11 is secured to a rotatable cylinder or drum member 12 which may be journaled in a suitable roller bearing, the stationary member of which is indicated by the numeral 13 in Fig. 2, carried by a supporting plate 14 which may rest on or be secured to the base 1. The plate 14 also carries a stationary cylindrical wall 15 disposed inwardly from the drum member 12. A cover 16 is provided with an outer depending wall which rests on the base 1 and engages the periphery of the supporting plate 14 and, in addition, has an inner depending wall engaging the inner surfaces of the stationary cylinder 15 to enclose around the drum 12 a toroidal air space which may be heated in any suitable manner to cure or vulcanize the strip material passing through the apparatus. The cover 16 may be provided on its inner surface with a layer of insulation 17.

Figure 2:
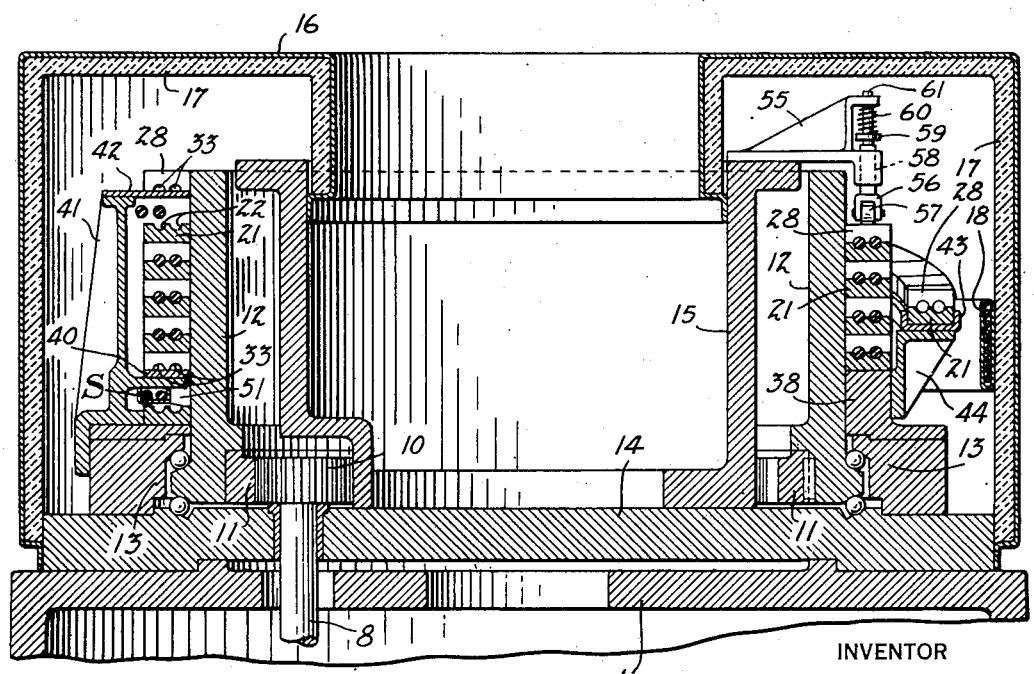
Fig. 2 is an enlarged vertical section taken substantially on line 2—2 of Fig. 1 illustrating details of the apparatus.

A method of heating the toroidal air space is indicated in Figs. 1 and 2. A resistance heating strip 18, in the form of an arcuate band, may be secured to the inside surface of the cover having terminals for connecting to a source of electricity which extend through the cover and are indicated by the numeral 20 in Fig. 1.

The mold cavity is defined by a pair of endless series of articulated individual mold sections which interfit during portions of their travel to cooperatively define the mold cavity.

These endless series of individual mold sections are disposed in a helical arrangement around the periphery of the drum 12, with individual turns of the helix in contact above and below with adjacent turns of the helix. Thus, in addition to forming a mold cavity for the strip material, the individual mold sections also provide a conveyor to conduct this strip material through the heated zone to accomplish the curing or vulcanizing. At the top of the helical arrangement the series of mold sections are directed radially outwardly and are then conducted downwardly in a substantially helical path. When they near the bottom of the drum 12 they are again directed inwardly and commence traveling in the helical path about the drum 12.

Near the bottom of the drum 12 the two series of mold sections are separated to permit the infeeding of untreated strip material. Near the top of the drum 12 and after the strip material has been sufficiently exposed to heat to accomplish the desired treating action, the mold sections are separated to permit the removal of the treated strip material.

The individual mold sections of the lower series of mold sections comprise arcuate blocks 21 having one or more grooves 22 in the upper face thereof of the desired cross sectional configuration to obtain the finished strip to be produced by the apparatus. Near each of its sides in each end thereof, the mold sections 21 have a socket 23 to accommodate approximately half of a link which connects the section to its adjacent sections.

Figure 8:
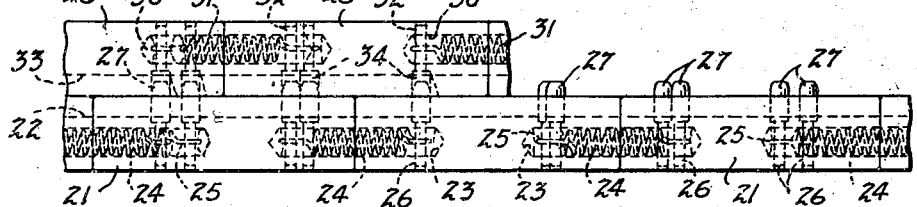
Fig. 8 is an enlarged fragmentary side elevation of the portion of the mold cavity shown in Fig. 7.
Figure 9:
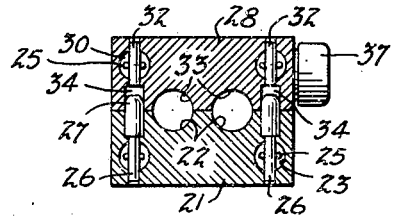
Fig. 9 is an enlarged sectional view, taken substantially on line 9—9 of Fig. 7, showing how portions of individual mold sections cooperatively define the mold cavity.

To insure close fitting of the sections 21, it is believed desirable to resiliently link the individual sections together, and for this purpose the links comprise helical coil springs 24. The springs 24 terminate in eyes 25 which embrace pins 26 which pass vertically through the blocks to engage and hold the springs. The pins 26 are provided at their top with an enlarged head portion 27 which projects above the top surface of the mold section 21 to provide a portion which may interfit with a mating portion in the upper series of mold blocks to maintain the blocks of the two series in alinement. To facilitate engagement the enlarged heads 27 of the pins 26 may be rounded or otherwise suitably tapered (see Figs. 8 and 9).

The upper series of mold blocks is made up of arcuate blocks 28 similar to blocks 21 and provided with sockets 30 in each end thereof to house springs 31 which resiliently link the blocks 28. The hook-shaped ends of the springs 31 are secured to the blocks by pins 32 which may be frictionally held or otherwise secured in apertures in the blocks 28. The lower faces of the blocks 28 are provided with grooves 33 which cooperate with the grooves 22 of the blocks 21 to define a continuous mold cavity for the strip material. This lower face of the block 28 is also provided with sockets 34 to receive the enlarged heads 27 of the pins 26. The mouths of the sockets or recesses 34 may be flared to facilitate the engagement of the heads 27 therewith as the two series of mold blocks travel along, as may best be seen in Fig. 8. The upper series of mold sections is longitudinally offset with respect to the lower series of mold sections so that the joint between adjacent blocks 28 will fall approximately centrally of one of the blocks 21 of the lower series; thus, the enlarged heads 27 of the pins 26 of one of the blocks 21 engages two of the blocks 28 of the upper series of mold sections to hold the same in place with respect to the lower series.

In order to drive the two series of mold sections, the drum 12, which is driven through previously described gearing by the motor 2, is provided with a plurality of vertical grooves or channels 35. Each of the blocks 28 of the upper series of mold sections carries a stud 36 on which is mounted a freely rotatable roller 37 having a rounded head to facilitate its engagement in one of the grooves or channels 35 of the drum 12, and when thus engaged the drums 12 drive the upper series of mold sections. Since these are interfitted with the lower series of mold sections, the lower series is driven by the upper series.

Figure 6:
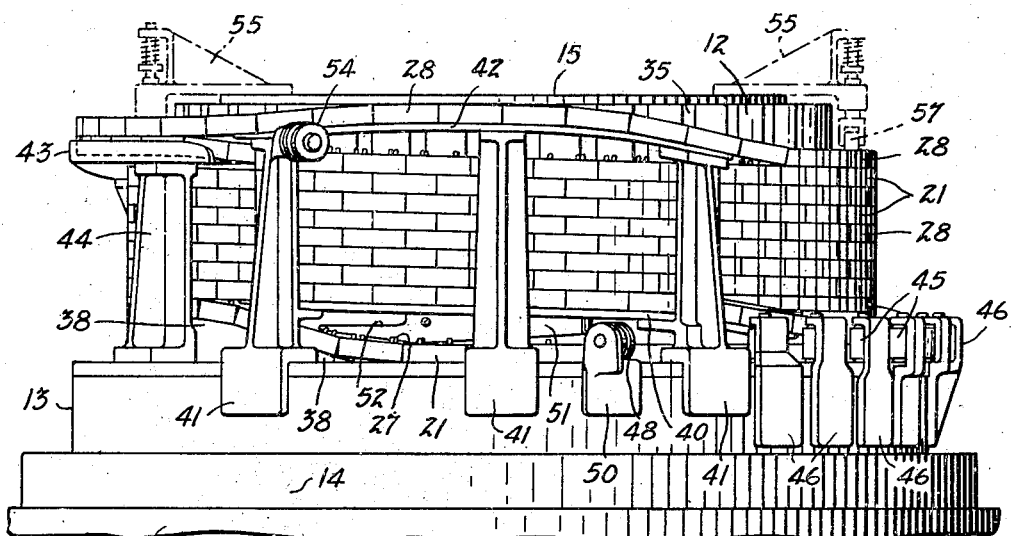
Fig. 6 is an enlarged elevational view of a portion of the apparatus as shown in Fig. 1 with the cover removed to show the arrangement of the endless series of mold sections in a helical path.
Figure 7:
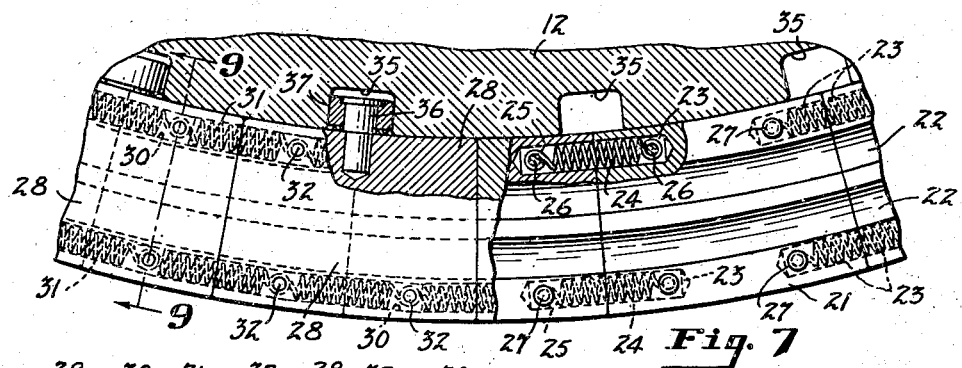
Fig. 7 is an enlarged fragmentary top plan view with parts broken away to show a portion of the mold cavity and the connection between individual mold sections.

At the infeed station of the mechanism the upper and lower series of mold sections are disposed in their separated position in order to permit the feeding of the untreated strip material therebetween. In this position the lower series of mold sections rests on and rides along the upper surface of the stationary bearing member 13. At about the point where the strip material is disposed in the grooves 22 of the blocks 21, an inclined track 38 (Figs. 4 and 6) secured to the bearing member 13 receives the blocks and directs them upwardly to engage with the blocks 28 of the upper series of mold sections. The upper series of blocks 28, during travel through the infeeding station, is supported by a track member 40, which track is carried by an angle bracket 41 which may be suitably secured to the stationary bearing member 13. As the drum rotates the interfitting series of mold sections are advanced upwardly, and after one rotation from the infeed station the interfitting series of mold blocks are disposed on top of and move along the upper series of mold blocks, then passing through the infeed station while supported by the track 40. Successive rotation of the drum 12 and the interfitting series of mold sections advances the blocks higher and higher along the periphery of the drum, during which time the strip material in the mold cavity is undergoing the vulcanizing process. Near the top of the drum 12 a suitably inclined separating track 42 is interposed between the upper and lower series of mold sections to separate them and permit removal of the vulcanized strip material. As may be seen in Figs. 2 and 6, the track 42 is carried by the top of one or more of the brackets 41.

After the completed strip material has been removed from the mold cavity, the upper and lower mold series are directed in a radially outward direction where they are supported by and move along a track or chute 43 which, after extending outwardly sufficiently to clear the lower portions of the series of mold blocks, extends in a downward helical path until it returns the mold blocks to their original position entering the infeed station. The track 43 may be suitably supported by stationary brackets indicated by the numeral 44 in Fig. 3. As the series of mold members reaches the end of its downward path approaching the infeed station, a plurality of vertically disposed rollers 45 carried by brackets 46 secured to the bearing member 13 are utilized to direct the mold sections in a radially inward direction to their position adjacent the periphery of the drum 12.

The untreated strip material, identified by the letter S in Figs. 1 and 3, is fed to the mechanism from a suitable source of supply, or directly from a forming machine or extruder (not shown), and travels into the space between the separated mold members in a substantially tangential path. The strip material passes through an aperture 47 in the cover 16 (see Fig. 1) which may be shaped to minimize the heat losses therethrough. To support the material during its travel from the source of supply, rollers 48 mounted for rotation on a bracket 50 carried by the stationary bearing member 13 may be provided. Inwardly of the rollers the untreated strip material may be supported and guided into the grooves 22 of the blocks 21 by a chute 51, the details of which may best be seen in Figs. 3, 4, and 5. The chute 51 is secured to the underside of the track 40 carried by the bracket 41 (Fig. 2). The chute 51 terminates in finger portions 52 which are disposed on opposite sides of the chute to guide the strip material until it is disposed within the grooves 22 of the blocks 21.

After the treatment of the strip material has been completed and the endless series of mold sections have been separated, the finished strip material, indicated by the letter P in Figs. 1 and 3, is removed in a substantially tangential direction, passing through an aperture 53 in the cover 16 for storage or use. During its passage from the machine, the strip material may be supported by freely rotatable support rollers 54 which are mounted on a shaft carried by an extension of one of the guide brackets 41, as may be seen in Figs. 3 and 6. To facilitate separation of the strip material from the mold cavity, the strip material may be suitably coated, such as with soapstone, prior to its being fed into the machine. Or, if desired, the mold cavity may be suitably dusted while the two endless series of mold sections are separated.

In the case of the treatment of sponge rubber strip material, it is desirable to firmly hold sections of the mold cavity together with a definite pressure, and if the blocks comprising the endless series of mold sections are made of a light metal, the weight of the blocks disposed in the upper portion of the helical path may not be sufficient. Accordingly, a plurality of spring pressed rollers may be provided to engage the top row of interfitting mold sections with the rollers being spring pressed to urge the mold sections downwardly under pressure. A plurality of supporting arms 55 may be secured to the top of the stationary cylindrical member 15. Near their outer end these arms are apertured to receive members 56, each of which carries two spaced freely rotatable rollers 57 adapted to engage the top row of the endless series of mold sections. The members 56 have a square stemmed portion 58 slidably received in an aperture in the arms 55. Above the square stem 58 a shoulder 59 is provided to engage one end of a spring 60 disposed around a cylindrical portion 61 of the member 56. The other end of the spring 60 bears against an extension of the arm 55. By making the shoulder 59 adjustable longitudinally of the member 56, such as in the form of a nut which may threadedly engage and move along the member 56, the compression of the spring can be adjusted to vary the pressure exerted by the rollers 57 against the mold sections. To minimize sliding movement between the rollers and the mold sections, the rollers may be made slightly conical.

If desired, the control for the drive of the strip material may be suitably interconnected with the control of the drive means for the drum 12, so that the operation will be substantially automatic. This may be accomplished in any one of several well-known methods.

Thus, it may be seen that in utilizing the apparatus and process embodying the present invention, untreated strip material may be continuously fed into the space between the separated series of mold sections. When the strip material is in place the mold sections are interfitted and travel through a heated zone in a helical path for a time sufficient to suitably treat the material. The treating time may be varied by regulating the speed of the mold sections moving in their helical path, or by the addition of turns to the helix, or by modifying the diameter of the helical path, or by a combination of the above methods. After the strip material has been treated, the series of endless mold sections are separated and the finished strip material removed therefrom, following which the mold sections are directed in another helical path opposed to the direction of the first helical path so that they are returned to their starting place.

In the apparatus embodying the present invention a large majority of the individual mold sections are in continual use, since it is only the mold sections traveling in the downward helical path that are not being continuously used and the downward helical path is considerably shorter than the upward helical path, being accomplished in less than one revolution of the drum 12. Further, the air space required to be heated is relatively small, resulting in a decreased cost of the finished material.

It is to be understood that the particular form of apparatus shown and described is presented for purposes of explanation and illustration and that various modifications of said apparatus and procedure can be made without departing from my invention as defined in the appended claims.

What I claim is:

1. Apparatus for continuously vulcanizing strip material which comprises an endless series of articulated mold sections, another endless series of articulated mold sections which interfit with said first series to cooperatively define a mold cavity, locking means holding said interfitting mold sections against movement relative to each other, means for maintaining said mold sections in spaced relationship while feeding unvulcanized strip material therebetween, means for driving said series in a helical path having a vertical axis while maintaining said series in interfitting and locked relationship, means for separating said series to permit removal of the vulcanized strip, and means for returning said series to said feeding position by moving said series in a helical path of greater diameter than said first mentioned helical path and in an opposite direction thereto.

2. Apparatus for continuously vulcanizing strip material which comprises an endless series of resiliently linked mold sections, another endless series of resiliently linked mold sections which interfit and lock with said first series preventing longitudinal movement between said series to cooperatively define a mold cavity, means for maintaining said mold sections in spaced relationship while feeding unvulcanized strip material therebetween, means for driving said series in a helical path while maintaining said series in interfitting and locked relationship, means for separating said series to permit removal of the vulcanized strip, and means for returning said series to said feeding position by moving both of said series in a helical path of greater diameter than said first mentioned helical path and in an opposite direction thereto.

3. An apparatus for continuously treating strip material which includes two endless series of articulated mold sections arranged to cooperatively define a mold cavity during a portion of their travel, means for progressively advancing the mold sections of said two series in a helical path through a heated zone, and means for holding mold sections of one series against movement relative to opposed mold sections of the other series during travel through said heated zone, said advancing means comprising a driven member having portions which engage portions of said mold sections to drive said two series.

4. Apparatus for continuously treating strip material which comprises a support, a member mounted for rotation on said support, an endless series of resiliently linked mold sections a portion of which are disposed in a helical arrangement around said member, a second endless series of resiliently linked mold sections a portion of which are disposed in helical arrangement around said member overlying portions of said first series, means for interfitting portions of one of said series with portions of the other of said series to prevent longitudinal movement of mold sections in one of said series relative to opposed mold sections in the other of said series and cause both of said series to travel in unison, and means carried by said member to engage and cause movement of at least one of said series.

5. Apparatus for continuously vulcanizing strip material which comprises a support, a member mounted for rotation on said support, a pair of endless series of resiliently linked arcuate mold sections a portion of which are disposed in a helical arrangement around said member, means for interfitting portions of one of said series of arcuate mold sections with portions of the other of said series of arcuate mold sections to prevent longitudinal movement of one of said series of arcuate mold sections relative to the other of said series of arcuate mold sections whereby when opposed mold sections are interfitting a mold cavity capable of withstanding pressure is cooperatively defined, cover means defining a toroidal air space surrounding said portions of the pair of endless series of arcuate mold sections disposed in a helical path, means for heating the toroidal air space defined by said cover means, and means for moving said pair of endless series of arcuate mold sections in unison, said last mentioned means including portions carried by said member and engageable with at least one of said pairs of endless series of mold sections.

6. Apparatus for vulcanizing strip material which comprises a pair of endless series of resiliently linked mold sections disposed in two helical paths about a cylindrical member and adapted to interfit and cooperatively define a mold cavity, with individual runs of said pair of endless series of mold sections supported by and adapted to move over an adjacent individual run, cover means defining a substantially enclosed air space surrounding the portions of said pair of endless series of mold sections disposed in helical paths and means for heating the air space defined by said cover means, means for holding said mold sections defining said mold cavity in stationary relationship with respect to each other during movement of said sections through said air space, the ends of said helical arrangement being connected by a portion of said pair of endless series of mold sections arranged in a second helical arrangement of larger diameter than said first helical arrangement and leading in an opposite direction thereto.

7. Apparatus for vulcanizing strip material which comprises a pair of endless series of resiliently linked mold sections disposed in two helical paths about a cylindrical member and adapted to interfit and lock to prevent relative movement of opposed mold sections in said endless series during a portion of the travel of said endless series of mold sections, individual runs of said pair of endless series of mold sections supported by and adapted to move over an adjacent individual run whereby said interfitting and locked mold sections define a mold cavity adapted to withstand pressure without separation of said mold sections, the ends of said helical paths being connected by a portion of said pair of endless series of mold sections arranged in a second helical arrangement having a larger diameter than said first helical arrangement and leading in an opposite direction thereto.

8. Apparatus for continuously making strip material particularly adapted for use for continuously making porous strip material which comprises a driven drum rotatable about a vertical axis, an endless series of resiliently linked arcuate mold sections disposed in a helical path about said drum, a second endless series of resiliently linked arcuate mold sections arranged in a similar helical path about said drum, the mold sections of said second endless series being associated with said first endless series to cooperatively define a mold cavity, dowel pins extending between opposed mold sections of said two endless series to lock said series against longitudinal movement relative to each other while said mold sections define said mold cavity, means for holding said two series of mold sections in close association to provide a mold cavity capable of withstanding pressure, means for separating said mold sections at predetermined points in their helical travel to permit insertion of raw material and removal of completed product, and interfitting elements carried by said drum and certain of said mold sections to drive said endless series of mold sections during rotation of said drum.

ROBERT F. HREBEK.

REFERENCES CITED

The following references are of record in the file of this patent:

UNITED STATES PATENTS

| Number | Name | Date |
|---|---|---|
| 240,626 | Warner | Apr. 26, 1881 |
| 284,579 | Towle | Sept. 4, 1883 |
| 1,564,473 | Dykes | Dec. 8, 1925 |
| 1,616,954 | Dykes II | Feb. 8, 1927 |
| 1,693,264 | Waner | Nov. 27, 1928 |
| 2,303,554 | Humphreys | Dec. 1, 1942 |